(12) United States Patent
Wang et al.

(10) Patent No.: US 7,831,112 B2
(45) Date of Patent: Nov. 9, 2010

(54) SPORTS VIDEO RETRIEVAL METHOD

(75) Inventors: Bei Wang, Los Angeles, CA (US);
Chia-Hung Yeh, Tainan (TW);
Hsuan-Huei Shih, Taipei (TW);
Chung-Chieh Kuo, Taipei (TW)

(73) Assignee: Mavs Lab, Inc., Lung-Tan, Tau-Yuan (TW)

( * ) Notice: Subject to any disclaimer, the term of this patent is extended or adjusted under 35 U.S.C. 154(b) by 1350 days.

(21) Appl. No.: 11/319,646

(22) Filed: Dec. 29, 2005

(65) Prior Publication Data

US 2007/0157239 A1    Jul. 5, 2007

(51) Int. Cl.
*G06K 9/00* (2006.01)
(52) U.S. Cl. .................... 382/305; 348/157; 707/914
(58) Field of Classification Search ............... 382/100, 382/305; 348/157, 700; 707/737, E17.028, 707/E17.101, 914, 916; 704/211, 215
See application file for complete search history.

(56) References Cited

U.S. PATENT DOCUMENTS

| | | | | |
|---|---|---|---|---|
| 2003/0016945 A1* | 1/2003 | Nakamura | ................ | 386/46 |
| 2004/0167767 A1* | 8/2004 | Xiong et al. | ................ | 704/1 |
| 2005/0125223 A1* | 6/2005 | Divakaran et al. | ............ | 704/223 |
| 2006/0059120 A1* | 3/2006 | Xiong et al. | ................ | 707/3 |

* cited by examiner

*Primary Examiner*—Andrew W Johns
(74) *Attorney, Agent, or Firm*—Jackson IPG PLLC; Demian K. Jackson

(57) ABSTRACT

A sports video retrieval method involves segregation of the video into multiple segments of different indexing conditions based on audience cheers recorded; the exciting intensity of the cheers being scored as the audio level of the cheers being in proportion of the wonderful performance of the athletes; cheer segments being retrieved and given rank depending on the score to each segment to provide the sports video segmental indexing with simple audio even including contents of video features.

8 Claims, 6 Drawing Sheets

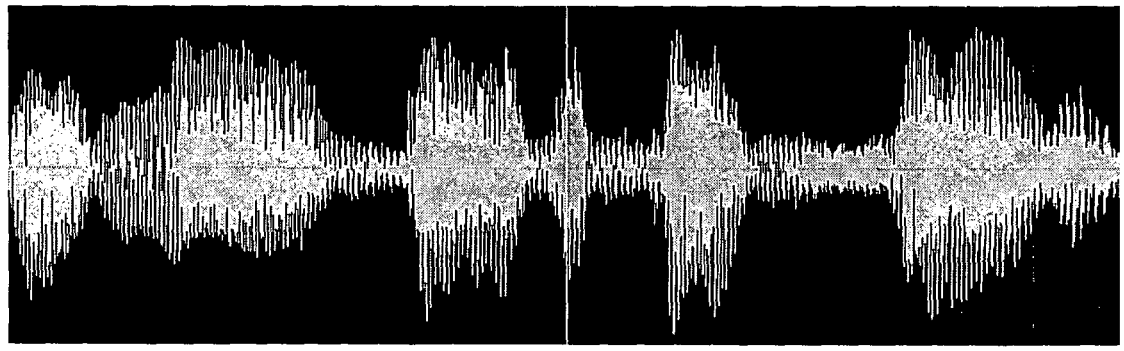
FIG.2 .A
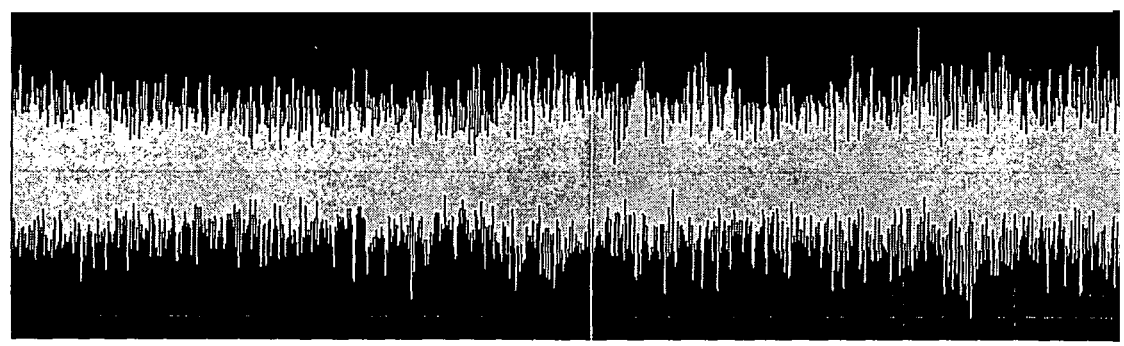
FIG.2 .B

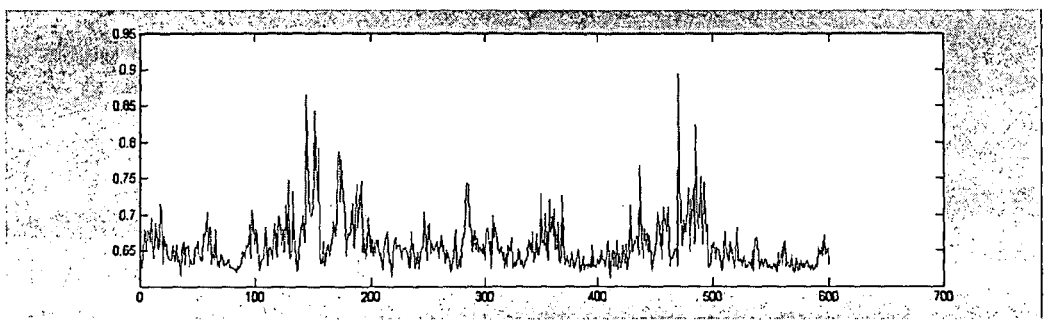
FIG.3.A
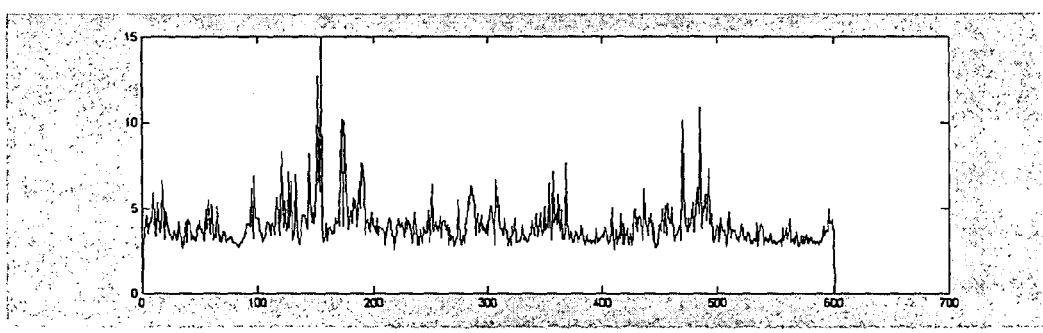
FIG.3.B
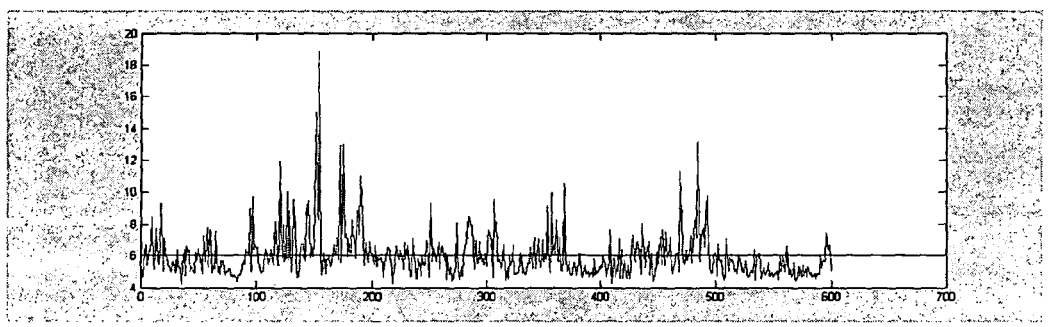
FIG.3.C
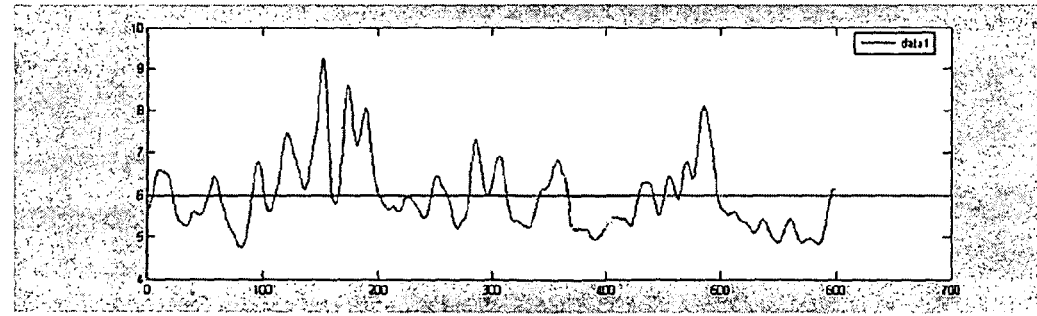
FIG.3.D

Fig. 5A: Long camera view
Fig. 5B: Middle camera view

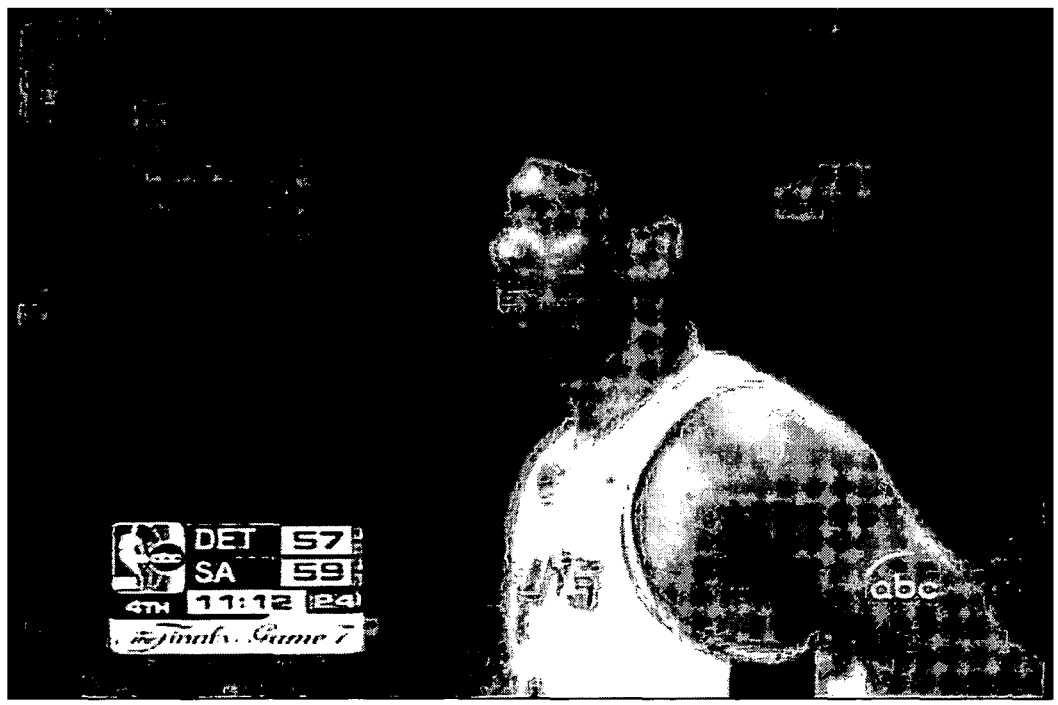
Fig. 5C: Close camera view

SPORTS VIDEO RETRIEVAL METHOD

BACKGROUND OF THE INVENTION (a) Field of the Invention

The present invention is related to a video contents analysis, segment indexing and retrieval technology, and more particularly, a method to provide segment indexing and highlights containing simple audio and video features.

(b) Description of the Prior Art

More and more attention is given to the content-based video indexing, retrieval and data management and the research results in these areas have been comprehensively applied in digital library, non-linear video indexing and video-on-demand service areas; particularly when applied in the analysis of sports video, it is found in observing the audio information of sports video data gives more benefits and better precision in event detection than the visual analysis does.

For example, basketball is one of the most popular sports in the world. A great number of professional and amateur games are played through the year. However, people may not wish to spend a couple of hours watching the entire game. They are just interested in the editing of attractive clips, e.g., wonderful offense and defense, arresting fouls and crucial time-out, etc., making the basketball highlighting an attractive multimedia application. Furthermore, basketball and similar games share many common features including the noise environment of the field when the commentator's live coverage is usually overwhelmed by the audience cheers when exciting moments take place.

SUMMARY OF THE INVENTION

The primary purpose of the present invention is to provide a sports video retrieval method. Wherein, the audience cheers recorded in the sports video are used to segregate the sports video into multiple segments based on the indexing conditions. Whereas the audience tends to cheer whenever the athletes coming up great performance and the cheers get more exciting as the performance becomes even more spectacular. Therefore, the segment is given score depending on the excitement extent of the cheers. Those cheer segments are then retrieved and given rank by the segment score to provide segment indexing containing simple audio and the video features for the sports video. The audio features used in the entire sports video indexing are in the time domain; therefore, the operation cost of the analysis and retrieval method is lower than that of any other frequency domain features.

BRIEF DESCRIPTION OF THE DRAWINGS

FIG. 2A is a chart of waveforms of commentator's speech without cheers.

FIG. 2B is a chart of waveforms of commentator's speech with cheers.

FIG. 3A is a chart of waveforms showing a cheer ratio of the present invention.

FIG. 3B is a chart of waveforms showing Kurtosis of the present invention.

FIG. 3C is a chart of waveforms of cheer dominant ratio of the present invention.

FIG. 3D is a chart of waveforms showing smoothed results.

FIGS. 5A, 5B and 5C are the camera views.

DETAILED DESCRIPTION OF THE PREFERRED EMBODIMENTS

The present invention is related to a technology applied in the analysis, segment indexing and retrieval of the contents in sports video. It is essentially involves the segregation of a sports video into multiple segments of different indexing conditions based on the audience cheers recorded in the sports video. Whereas the audience tends to cheer whenever the athletes coming up great performance and the cheers get more exciting as the performance becomes even more spectacular. Therefore, the segment is given score depending on the exciting extent of the cheers. Those cheer segments are then retrieved and given rank by the segment score to provide segment indexing containing simple audio and even the video features for the sports video.

Figure 1:
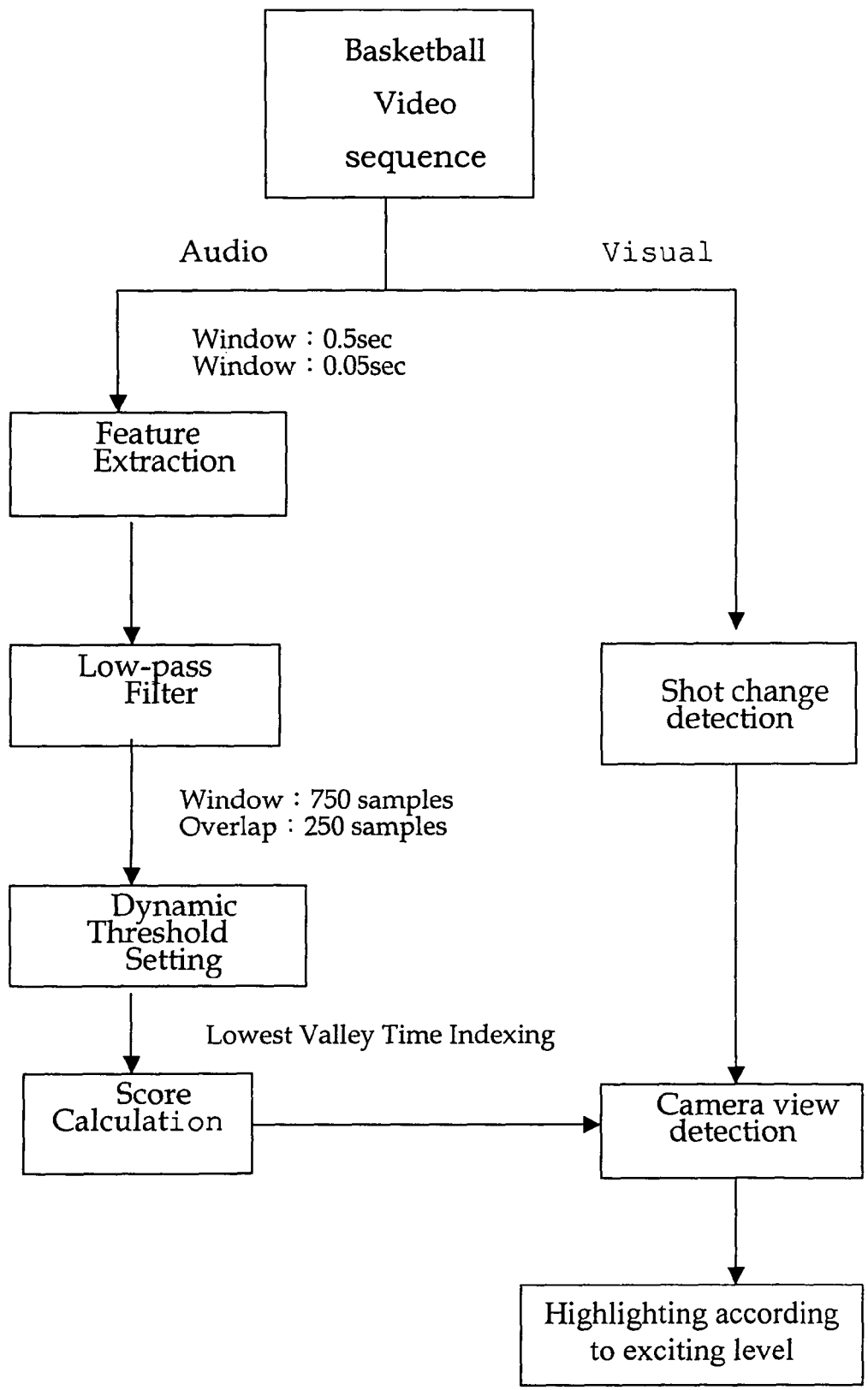
FIG. 1 is a flow chart of basketball highlighting of a preferred embodiment of the present invention.

Referring to FIG. 1 for an algorithm flow chart, the audio features used are based on the cheer property within the time domain. Taking a video of a basketball game for example, two commentators are usually present in a live broadcasting program and their audio wave (wave form) displays in the time domain clear and significant speech features. Whenever there is the moment of wonderful defense or offense, the audience immediately cheers and applauds to the players. The sound of the audience cheer is referred as "noise". Since the "noise" indicates no periodical information, nor fundamental frequency, it behaviors like a "white noise". They look like just as the addition of two types of signal in time domain, one is "pure speech" and the other "white noise". The speech signal is embedded in the noise and make the envelop of speech not so clear to view.

As illustrated in FIG. 2A for the speech of the commentator without the audience cheer, and in FIG. 2B for the speech of the commentator with the audience cheer, the difference rests in that the short time property of the pure speech can be observed but it becomes not clear due to the addition of the noise as illustrated in FIG. 2B. The X-axis for the waveform illustrated in both FIGS. 2A and 2B is time, and the Y-axis is the amplitude, which is directly related to energy. By comparison made between FIGS. 2A and 2B, it is concluded that the mean of the energy when the audience cheers take place is greater than that without the audience cheers. Meanwhile both envelopes look drastically different (within the short time window, the standard deviation of the waveform in FIG. 2A is greater than that in FIG. 2B). Whenever the cheer appears, the mean of the short time energy gets greater as the standard deviation gets smaller. Accordingly, this new property is defined as a "cheer ratio" and it is quotient of the standard difference divided by the mean of energy (Cheer Ratio=Std/mean).

In the presence of the cheers, there are the greater mean of energy and smaller standard deviation for short window; therefore, the cheer ratio is small. Intuitively, the change in energy is a significant factor. The value of the first order moment is given larger weight than that to the second order. The similar results are found with the fourth central moment similar to that of the cheer ratio property. The fourth moment is known as Kurtosis, which is solved by measuring tails for a distribution. As illustrated in FIGS. 3A and 3B, cheer ratio and Kurtosis are disclosed in a continuous 5-minute basketball sequence. Wherein, both figures show similar envelopes with the only difference in scale. To achieve a more accurate extraction, large dynamic scale is expected. Accordingly, the property is defined as Cheer Dominant Feature (CDF)=Kurtosis/Cheer Ratio to get a larger scale result. A black line in FIG. 3C is designated as the cheer dominant using the approximate threshold; it is equivalent to a valley dominant. The cheer dominant feature is allowed to pass through a low-pass filter to get smoother result, which is illustrated in FIG. 3 (D), and the valley under the black line is easier to tell apart.

Whereas the hotter the cheer, and the smaller the value of the cheer ratio, each segment is given a score according to this property. As illustrated in FIG. 3 (D), there are multiple valleys under the black line (threshold), which correspond to multiple cheer segments. However, their depth and width are different, thus a 'water-level raising up' method is used to calculate the score for each cheer segment. Two parameters, respectively the valley depth under threshold (weight) and the width of the valley at the threshold level (time duration) determine the score.

Since the depth provides dominate information, the weight of deeper water level is greater than the lower on and it is defined as follows:

$$\text{Weight} = (1/\text{water level})^2$$

A rule is set to give the cheer segment a score for ranking. In setting the threshold to decide the cheer segment duration, it is not expected that the whole hourly game have the same threshold. A dynamic threshold-setting rule is decided by the local information. Accordingly, a sliding window containing seven hundred and fifty (750) samples passes the smoothed result. Wherein, the overlap is 250 samples. In each sliding window, a "zero-crossing-like" ratio is solved for each water level, and the step between each water level can be either linear or non-linear.

Figure 4:
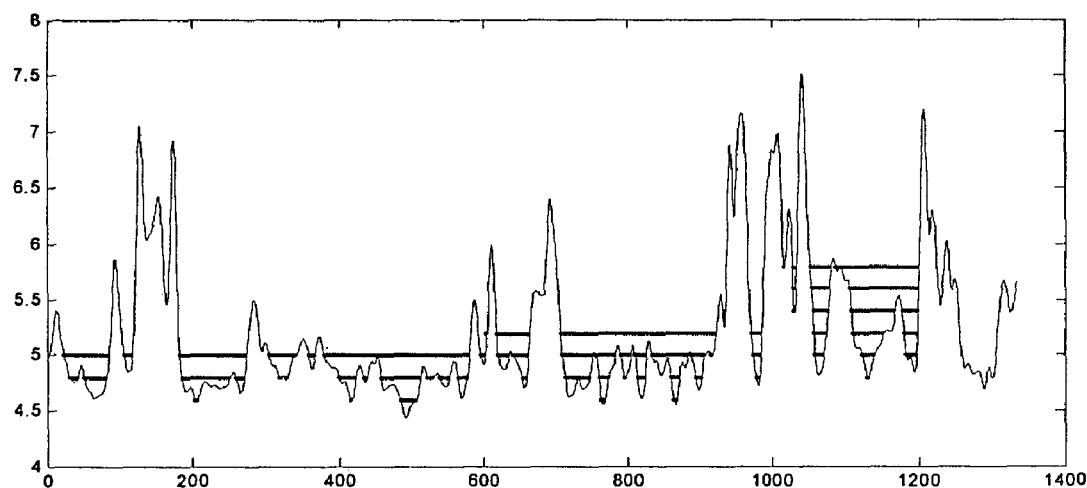
FIG. 4 is a chart of waveforms showing the result of dynamic threshold setting for a 10-minutes basketball sequence.

The threshold is solved under the 'zero-crossing like' rule since it is expected that the cheers happening site gives a unstable property in time domain, thus it is proper to let the highest change rate correspond to exciting threshold in time domain. After having the water level with highest 'zero-crossing like' ratio, the threshold is exactly at the highest ratio we got. FIG. 4 shows the result of dynamic threshold setting for a 10-minutes basketball sequence.

To make the story more complete and independent, a simple video processing is leveraged, i.e., a set of shot change index is provided. Besides that, we will also use one more visual feature, camera view. Roughly, we can divide the camera view into 3 classes, long, middle and close, which are denoted as FIGS. 5A, 5B, and 5C respectively. For a regular processing game, the middle view is used, while close view and long view are not directly related to the game, thus we are only interested in those and the highlights will only be related to middle view frames. Thus, after we got the shot change index, we are going to perform the camera view detection, remove those close view and long view shots, and the rest will further combine the middle view information with audio parts. For each 'valley' (cheer segment), a beginning time index and an ending time index, $[A_b, A_e]$ are given for each "valley" (cheer segment). The half depth water level (half threshold) is defined as an index for beginning time and ending time to find the corresponding video frame and locate an independent shot. Another set of time indexing according to visual information is made available, respectively referred as $[V_b, V_e]$. The final cheer time indexing $[F_b, F_e]$ is solved by $F_b = \max(A_b, V_b)$ and $F_e = \max(A_e, V_e)$. Accordingly, the segment extraction is complete and independent. A score is assigned for each cheer segment, which is then ranked according to the exciting level to provide for the sports video segment indexing of the contents containing simply sound and even the inclusion of video features.

User is free to decide how many segments or how long to view after having recorded the entire match. We will provide two choices for users. The first is for the users who only want to watch very exciting segments, we will give out the segments ordered in rank and what he needs to provide is the number of segments he wants to view; the other choice is for the users who want to view comparably longer and time consistent segments, what he needs to provide is the approximate time he wants to view, and then we will give out the segments in time order.

The present invention provides a technology applied in the analysis, segment indexing and retrieval of the contents in sports video, and this application for a patent is duly filed accordingly. However, it is to be noted that the preferred embodiments disclosed in the specification and the accompanying drawings are not limiting the present invention; and that any construction, installation, or characteristics that is same or similar to that of the present invention should fall within the scope of the purposes and claims of the present invention.

I claim:

1. A sports video retrieval method is related to a mechanism by segregating the sports video into multiple segments for retrieval by giving a score to each of multiple segments of the audience cheers depending on the excitement degree; and sound of those segments of audience cheers are extracted in sequence according to the score given to each segment.

2. The sports video retrieval method of claim 1, wherein, the score for each segment of cheer is the quotient of a weight divided by a duration time; the weight is related to the depth of the valley under a threshold; the duration time is related to the width of the valley under the threshold; in the sequence of the score by segment of cheer, a dynamic threshold setting rule decided by the local information, a "zero-crossing-like" ratio is solved for each water level, and the step between each water level can be either linear or non-linear; the threshold is solved under the 'zero-crossing like' rule; the highest change rate correspond to exciting threshold in time domain is justified; and after having obtained the water level with highest 'zero-crossing like' ratio, the threshold is set at 0.1 or 0.2 above the ratio to make each small story complete.

3. A sports video retrieval method is related to a mechanism by segregating the sports video into multiple segments for retrieval by giving a score to each of multiple segments of the audience cheers depending on the excitement degree; and sound and video of those segments of audience cheers are extracted in sequence according to the score given to each segment.

4. The sports video retrieval method of claim 3, wherein, the score for each segment of cheer is the quotient of a weight divided by a duration time; the weight is related to the depth of the valley under a threshold; the duration time is related to the width of the valley under the threshold; in the sequence of the score by segment of cheer, a dynamic threshold setting rule decided by the local information, a "zero-crossing-like" ratio is solved for each water level, and the step between each water level can be either linear or non-linear; the threshold is solved under the 'zero-crossing like' rule; the highest change rate correspond to exciting threshold in time domain is justified; and after having obtained the water level with highest 'zero-crossing like' ratio, the threshold is set at 0.1 or 0.2 above the ratio to make each small story complete.

5. The sports video retrieval method of claim 3, wherein, the video segment is determined by a beginning time index, $A_b$, and an ending time index, $A_e$; a half depth water level (half threshold) is defined as an index for the beginning time and ending time to find the corresponding video frame and locate an independent shot.

6. The sports video retrieval method of claim 3, wherein, indexing for each video segment is made by visual information respectively referred as $[V_b, V_e]$; and the final cheer time indexing $[F_b, F_e]$ is solved by $F_b = \max(A_b, V_b)$, and $F_e = \max(A_e, V_e)$ to extract a complete and independent video segment.

7. The sports video retrieval method of claim 3, wherein, an approximate threshold is used to denote a cheer dominant; and the cheer dominant is allowed to pass through a low-pass filter to get smoother result.

8. The sports video retrieval method of claim 7, wherein, the cheer dominant Feature (CDF)=Kurtosis/Cheer Ratio; the Cheer Ratio=Standard Deviation/Mean of Energy; and the Kurtosis resulted from measuring tails for a distribution with its property similar to that of the cheer ratio.

\* \* \* \* \*